J. B. HAYWARD.
CASH REGISTER.
APPLICATION FILED JUNE 19, 1905.
1,119,955.
Patented Dec. 8, 1914.
5 SHEETS—SHEET 2.
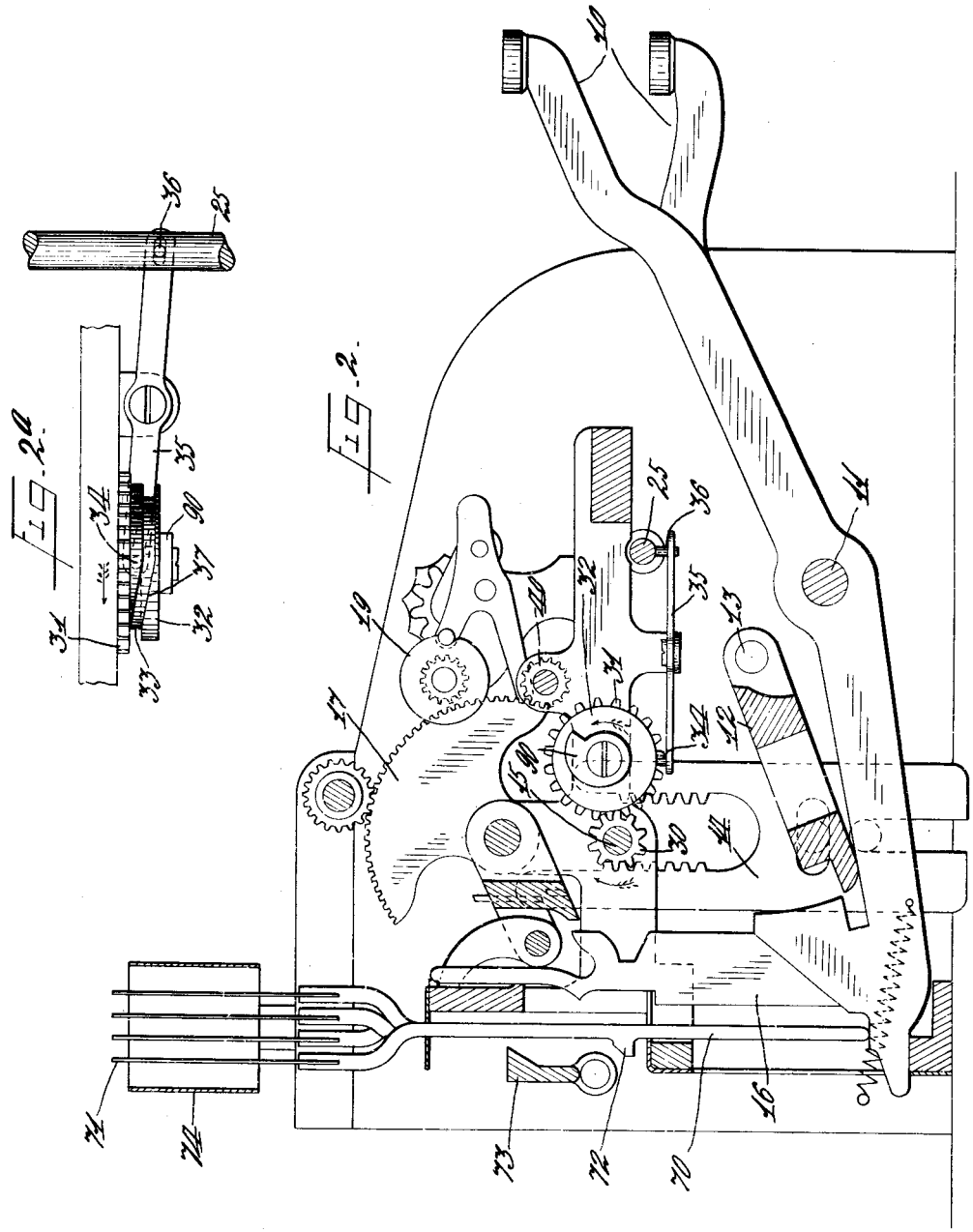
Witnesses
Inventor
J. B. Hayward

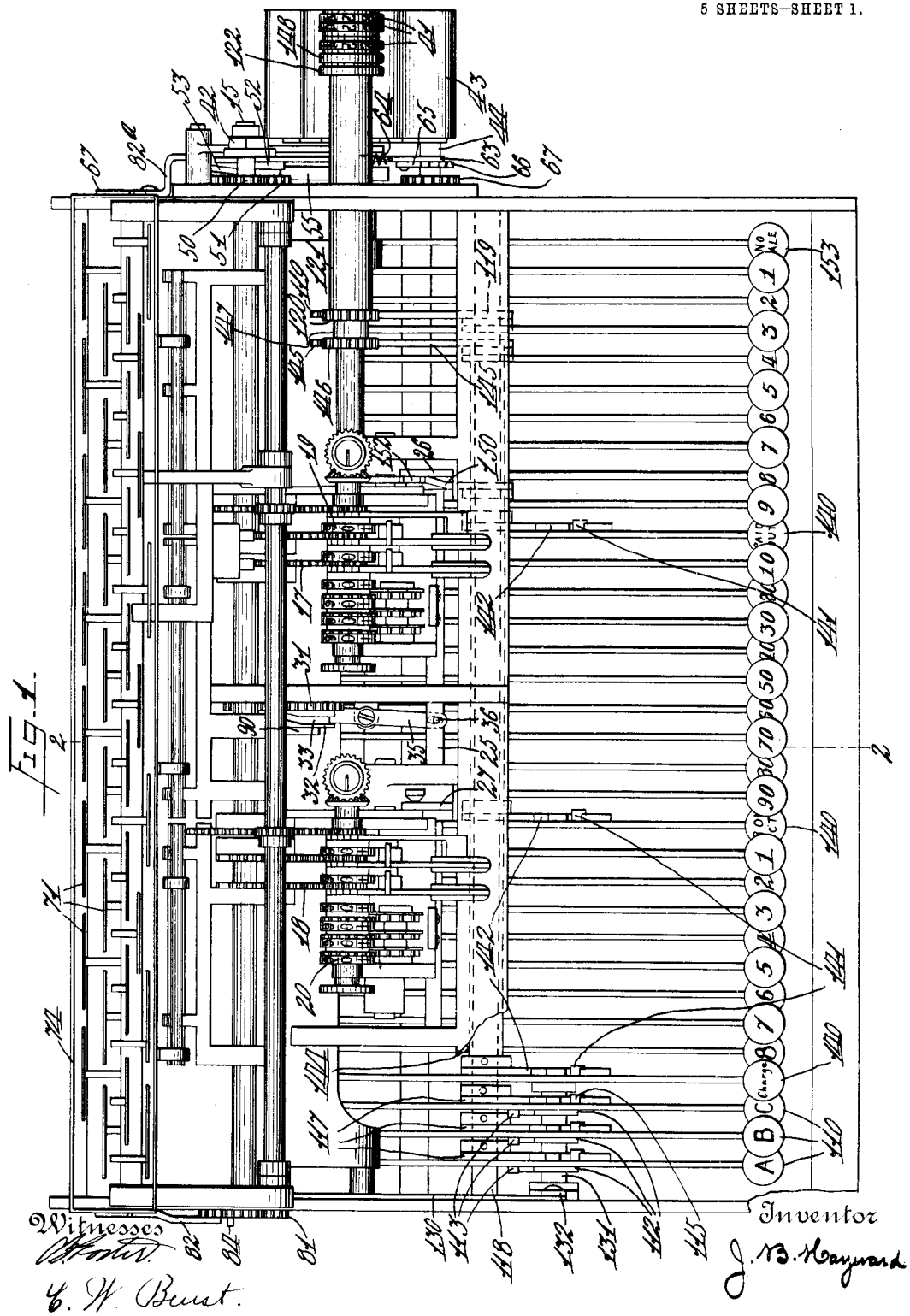

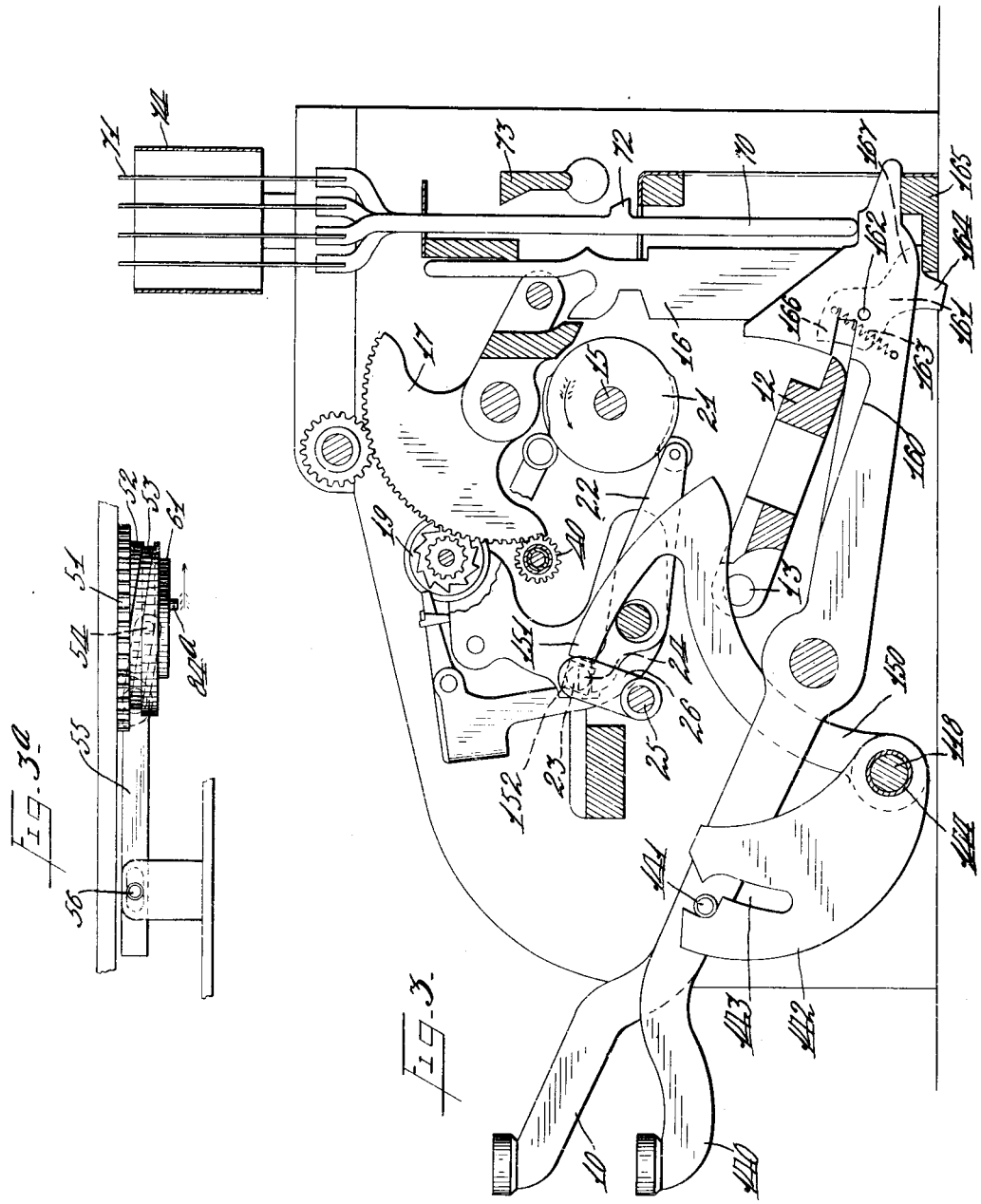

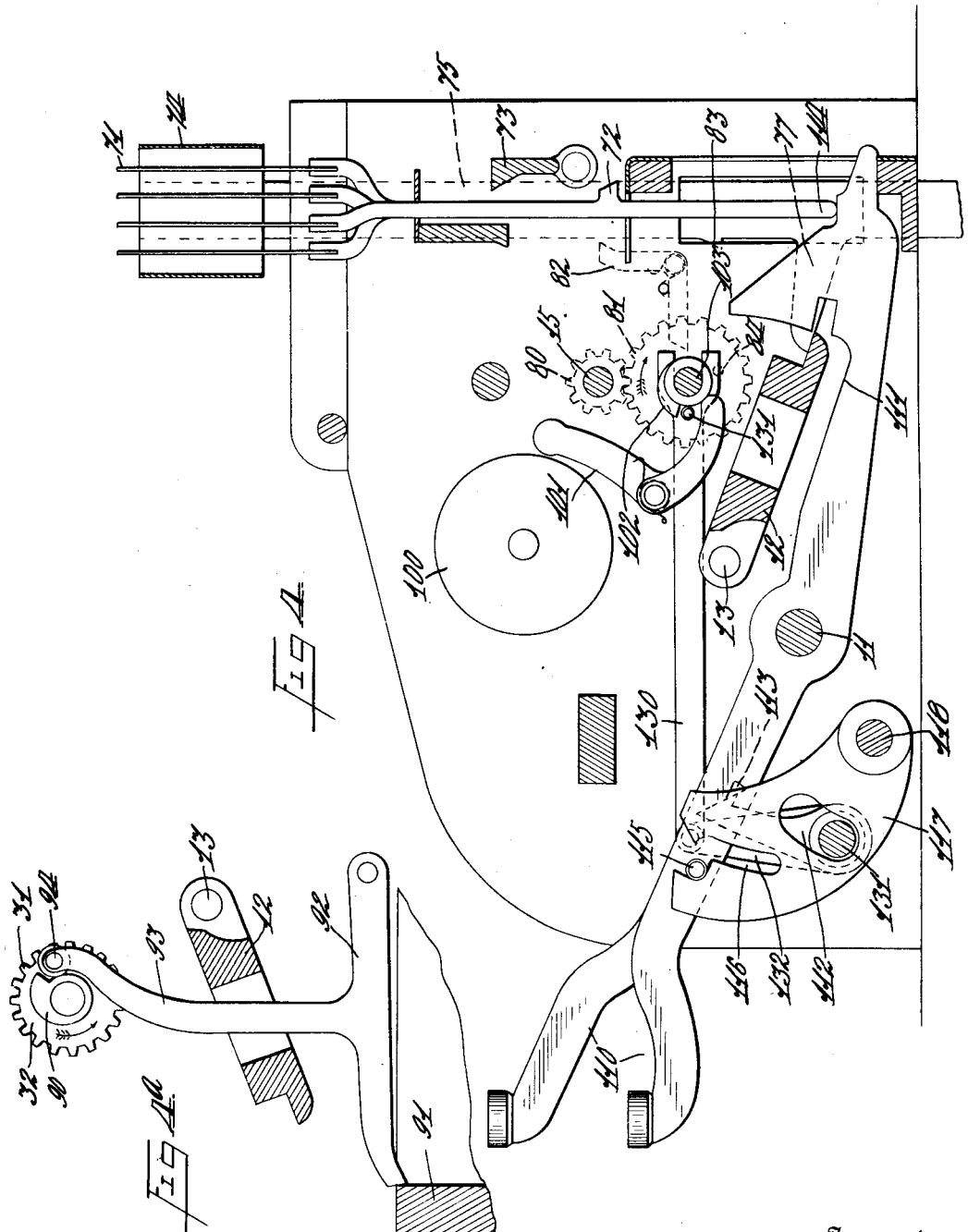

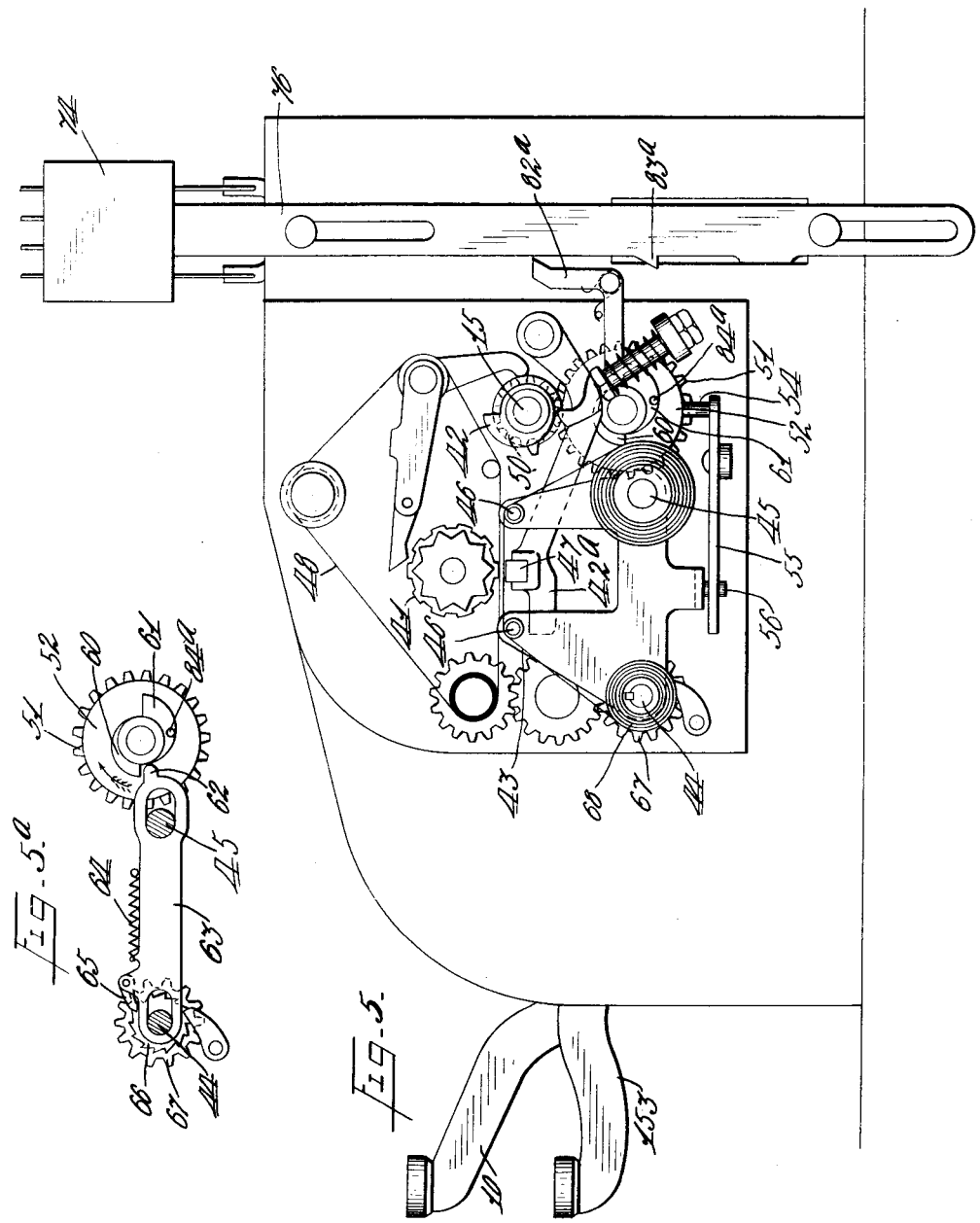

UNITED STATES PATENT OFFICE.

JONATHAN B. HAYWARD, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,119,955.   Specification of Letters Patent.   Patented Dec. 8, 1914.

Application filed June 19, 1905. Serial No. 265,841.

*To all whom it may concern:*

Be it known that I, JONATHAN B. HAYWARD, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers, and more particularly to that class of machines in which a certain number of complete operations of the machine constitute a cycle of operations for correlated transactions. Machines of this character may have various purposes in the cash register art, one example of such machines being the so-called "cost and selling price" machine, in which the machine is first completely operated to take an accounting of the cost price and then completely operated again to take an accounting of the selling price.

It is the purpose of the present improvements to provide such improved forms of devices in connection with machines of this type, as to automatically insure the separate accounting or grouping of these various correlated transactions upon a continued succession of operations of the machine; also to provide devices whereby when the machine stands at an intermediate stage in any one of these cycles of operations, certain normal functions of the machine will be or will have been disabled so as to indicate to the operator or to the purchaser that the normal cycle of operations has not been completed.

It is also among the purposes of this invention to provide in connection with the above devices, certain improvements in connection with the key mechanism of the cash register to permit certain keys to remain automatically operative during the cycle of operations after an initial depression thereof; also to provide a novel form of arrangement of the special keys to permit the proper entry of special transactions upon the machine; and also to provide a novel paper feed mechanism forming a desirable adjunct to the other mechanism utilized in this grouping of the transactions.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings, Figure 1 represents a top plan view of the cash register to which these improvements are applied. Fig. 2 represents a vertical sectional view approximately on the line 2—2 of Fig. 1. Fig. 2ª represents a detail view of the part of the automatic shifting devices. Fig. 3 also represents a vertical sectional view of the machine showing certain of the devices connected with the special transaction keys. Fig. 3ª represents a detail view of parts of the automatic shifting devices. Fig. 4 represents a vertical section of the machine showing certain of the devices in connection with the clerks' keys and the flash mechanism and alarm mechanism. Fig. 4ª represents a detail view of the drawer release mechanism. Fig. 5 represents an end view of the printer attached to the right hand end of the machine; and Fig. 5ª represents a detail view of the paper feed mechanism.

It is to be understood that in some of these views it has been necessary to omit certain parts of the machine for the sake of clearness.

The type of machine to which these improvements are applied in its general form of construction is now well known in the art, being of the type shown in patent to Thomas Carney No. 497,860 dated May 23, 1893, and No. 683,877 dated Oct. 1, 1901, and certain of the devices herein, connected with the throwout counter mechanism are similar to those shown in patent to Joseph P. Cleal, No. 773,060, dated October 25, 1904, and also to the invention described in the co-pending application of Joseph P. Cleal, filed January 18, 1906, Serial No. 322,252, same assignee, to all of which patents reference may be had for a more detailed description.

For the purpose of a better understanding of the description to follow, it may be stated that the specific form of means adopted in the present instance for securing the general broad results above outlined, comprises a machine having two independent counters which are operated upon by a series of amount keys; and by means of an automatic shifting device, after the first operation of the keys has effected the actuation of one of these counters, the next succeeding operation of the keys acts upon the other counter, and then the following operation acts upon the first counter, and so on, thus automatically shifting from the use of one counter to the other, so that the first counter could be used to register the cost price of goods sold and the second counter could be used for registering the selling price of the goods sold and thus the first counter would give a total of the cost price of all of the goods sold during any particular period and the second counter would give the total amount of the selling price for the same period; and since the registration on these counters would work confusion of the individual amounts, printing devices are provided which print the individual items of each transaction and separate these printed amounts into two groups, one for each counter, that is, one for the individual items comprising the cost prices and the other group for the individual items comprising the selling items. Further, since it is extremely necessary and desirable that the machine should not be left at an intermediate stage in its cycle of operations, that is, that it should be completely operated twice so as to register upon both counters and then leave the machine in condition so that upon the next operation of the machine the first counter will be prepared for operation and thus no mistake can be made by getting the cost price on the wrong counter, the indicator flash mechanism is so arranged that the indicators will not be exposed except after the complete cycle of operations when both counters have been properly operated or the machine has been properly operated twice in succession; and in order to call attention still further to the incomplete stage of the machine at the end of one operation, the cash drawer is arranged so that it will be released only at the end of each second operation, and the alarm mechanism is also sounded only at the end of each second operation, so that if the machine is only given one complete operation, the machine will obviously rest in such condition as to show immediately that the necessary cycle of operations has not been completed. Still further, a series of clerks' keys are provided which may be initially pressed and then are completely operated upon the operation of the machine but do not return to complete normal position until the second operation of the machine, so that they will again be operated automatically upon such second operation of the machine without compelling the clerk to give his attention to depressing the same again; and a series of special transaction keys are provided which are normally locked and are only unlocked after the first operation of the machine in any cycle, and when so unlocked and operated, effect the throwing out of operation of the second counter so that the special transaction amounts are not added upon this second counter; and in order to unlock these keys and put the machine through the first half of its cycle of operation, a "no sale" key is provided which when operated brings the machine to its second stage in the cycle and thus permits the operation of the special transaction keys to permit the cycle of operation.

Referring to Fig. 2, the amount keys 10 are pivoted upon a transverse shaft 11 and when depressed raise a key coupler 12 carried upon a rock shaft 13, and the oscillatory movements of the key coupler reciprocate a double rack 14 to give a complete revolution to the main operating shaft 15 of the machine. Attached to the rear end of each amount key is a lifter bar 16 which operates a registering segment 17, there being one of these registering segments for each bank of amount keys, and as shown in Fig. 1 there are two sets of these registering segments 17 and 18 which are coupled together to operate simultaneously and there are two counters 19 and 20 coöperating respectively with the registering segments 17 and 18. These counters are mounted on rock frames and are arranged to be thrown into operative relation with their respective operating segments. These throwing devices are the same for each counter and as shown in Fig. 3 comprise a cam disk 21 mounted upon the main revolution shaft 15 and acting upon a throwing lever 22, the forward end of which acts upon a spring-pressed shifting plunger 23 extending outward from the rock frame carrying the counter, so that upon the revolution of the shaft 15 the throwing lever 22 will be operated to rock the counter 19 into engagement with its segment 17, so that the counter will be actuated upon the depression of the amount keys. There is one of these plungers 23 for each counter, and as shown in Fig. 3, these plungers have notches 24 formed in them so that when said notches rest above the throwing levers 22 the counter will be disabled and will not be thrown into operative position, whereas when the full portion of the plunger 23 lies above the throwing lever 22 the counter will be thrown into operation. These plungers for the two counters have their notches so situated that normally the full portion of the plunger for the left-hand counter 20 stands opposite its corresponding throwing lever, while the plunger for the right-hand counter 19 stands with its notched portion above its respective throwing lever 22 so that if the machine be operated while this is the situation of the plungers, only the left-hand counter 20 would be operated. For convenience in designation, the left hand counter 20 will be hereafter referred to as the cost counter and the right-hand counter 19 will be referred to as the selling counter, although it is to be understood that these counters may be used for other classifications. Extending transversely below the counter rock frames is a shifting rod 25 (see Figs. 1, 2 and 3) which carries upwardly extending arms 26 and 27, which arms stand opposite the aforesaid spring-pressed plungers 23 so that when the shaft 25 is shifted laterally, the spring pressed plungers will be operated upon to shift the relative positions of their notches and their full portions.

All of the preceding mechanism is old and described in detail in the aforesaid Carney and Cleal patents, the said Cleal patent describing more especially the mechanism connected with the shifting rod 25 for throwing either one or the other of the two counters into operative condition. In the present machine the shifting rod 25 normally stands shifted to the left so that it operates upon the spring-pressed plungers 23 in such manner as to leave the cost counter 20 normally in operative condition and the selling counter 19 in inoperative condition with respect to their throwing levers, so that when any amount key is now operated the amount thereof will be added upon the cost counter. In the aforesaid Cleal patent this shifting of the rod 25 was effected by means of a hand-operated push button which had to be operated to shift from one counter to another, but in the present machine this shifting rod 25 is automatically shifted back and forth at each operation of the machine so that as soon as the amount keys have been depressed to add upon the cost counter, the rod 25 will automatically be shifted to the right to permit the plungers 23 to assume their other positions wherein the cost counter will not be thrown into operation but the selling counter 19 will be thrown into operation upon the next succeeding operation of any amount key. This automatic shifting means will now be described.

Fast upon the main operating shaft 15 (see Fig. 2) is a pinion 30 which meshes with a gear wheel 31 of double the diameter of the pinion 30 so that while the pinion 30 is given a complete revolution at each operation of the machine, the gear wheel 31 will be given only a half revolution at each operation of the machine. Fast upon the side of this gear wheel 31 is a cam disk 32 having a peripheral cam groove 33, the shape of which is best shown in Fig. 2$^a$. Into the underside of this cam groove there projects a pin 34 carried upon the rearward end of a lever 35 pivoted at its central position and formed at its forward end with a slot engaging the pin 36 (see also Fig. 1) extending downward from the aforesaid shifting shaft 25. Upon the operation of the machine, the downward depression of any amount key will cause a half revolution of the pinion 30 and a quarter revolution of the gear wheel 31, and this will carry the cam disk 32 a quarter revolution, but in such quarter revolution the shape of the cam groove 33 is, as shown in Fig. 2$^a$, parallel to the lateral surface of the disk, so that the pin 34 is not moved in such downward depression of the amount key, but upon the return of the amount key to normal position and the consequent completion of the half turn of the gear wheel 31, the cam portion 37 of the groove 33 now becomes effective to operate upon the pin 34 and shift the rod 25 laterally to the right, thereby shifting the respective positions of the aforesaid counter plungers 23 in the manner above explained so that at the end of this complete operation of the machine the counter 20 is now normally inoperative and the selling counter 19 stands ready to be operated upon the next operation of the machine, and upon such operation, the gear wheel 31 and disk 32 are given their next half revolution, during the first part of which the rod 25 is not affected but during the last half of which the rod 25 is again automatically shifted back so that the cost counter now stands ready to be operated and thus the complete cycle of operations is finished. In this manner, if the clerk has sold goods the cost price of which is $1.25 and the selling price of which is $1.50, he simply first presses amount keys to the amount of $1.25 which amount is immediately added upon the cost counter 20, and at the end of this complete operation of the keys for this amount, the shifting device is operated so that the selling counter 19 is now automatically made operative and the clerk need only immediately again press the amount keys to the amount of $1.50, which amount is then added upon the selling counter 19, and at the end of this operation of the machine the shifting device is again operated to bring the machine back into its normal position with the cost counter 20 ready to be operated, thus completing the cycle of operations. It will be seen from the above that the cost counter will at the end of the day show the total cost of the goods sold and the counter 19 the total selling price of the goods sold, but in order to preserve an individual record of the various items, a printing device is employed in which the cost items are individually printed in one column and the selling items individually printed in another column so that the two columns may be readily individually added to see if the amounts thereon correspond in total with the counters. This shifting of the printing from one column to another is also automatic so that the column printing will always correspond with the particular counter operated, and this automatic column shifting mechanism will now be described.

As shown in Figs. 2 and 3 the aforesaid registering segments 17 mesh with pinions 40 and these pinions are in a well-known manner connected by nested sleeves with the amount printing wheels 41 (see Figs. 1 and 5). (Suitable clerk's printing wheel and special transaction wheel are provided to print alongside of the amount wheels as will be later described.) The right-hand end of the main revolution shaft 15 is extended through to the printing attachment and as shown in Fig. 5 carries a platen operating cam 42 which actuates the platen 42ª to depress the same against spring tension and allow the same to fly up to take an impression from the type wheels. The paper upon which the various impressions are to be taken comprises a strip 43 which as shown in Fig. 1 is wide enough to have impressions taken in two separate columns, and this strip is carried upon a shifting carriage which slides laterally upon suitable guiding shafts 44 and 45. The paper 43 is supported upon guide rollers 46 and extends across and underneath the type wheels 41 and the platen 42ª has a laterally extending platen head 47 which projects in under the paper over the entire width of the type so that the impression may be taken by forcing the paper up against the type and the impression will occur in one column or another according to the shifted position of said carriage. An ink ribbon 48 is suitably carried by guiding and supporting rollers to extend between the paper and the type. The general construction of this printing mechanism with its association of various parts is set forth more in detail in Patent No. 683,877.

The shifting of the carriage to effect the printing in separate columns will now be described.

Fast upon the aforesaid shaft 15 just between the side frame of the machine and the printing attachment (as shown in Fig. 1) is a pinion 50 which meshes with a larger gear wheel 51 (see Figs. 5 and 3ª) carrying a cam disk 52 having a peripheral groove 53, the construction of which cam disk and groove is similar to that already described in connection with the similar disk 32 which is utilized for the automatic shifting of the counters. Projecting into the underside of the groove 53 is a pin 54 carried upon the rearward end of a lever 55 which at its forward end is slotted to engage a pin 56 extending downward from the aforesaid laterally shifting printing carriage. The shape of the groove 53 and its operation upon the lever 55 is similar to that already described in connection with the aforesaid disk 32, so that it will readily be understood that upon the depression of an amount key the pinion 15 is given a half revolution and the gear wheel 51 a quarter revolution, during which time the cam groove 53 has no effect upon the pin 54 and does not shift the printing carriage, but upon the return upward stroke of the key, the beveled portion of the groove 53 now operates upon the lever 55 to shift the carriage to its other position. The normal position of the carriage is shown in Fig. 1 and in such position the operation of the machine will cause the amounts to be added upon the cost counter 20 and the individual amount of this cost transaction to be printed in the right-hand column on the paper 43; but as soon as the cost amount has thus been entered by this complete operation of the machine, the printing carriage is automatically shifted in the last part of such operation, so as to move the carriage to the right and thus bring the left hand column in underneath the printing wheels so that upon the next operation of the machine the selling counter 19 is actuated, the individual amount of such transaction will then be printed in the left hand column or selling price column, and then at the completion of this cycle of operations of course the carriage is again automatically shifted back to its normal position ready for printing in the right-hand column or cost price column. The paper feeding mechanism in connection with this printing will now be described.

Fast upon the side of the aforesaid cam disk 52 is a double snail cam comprising a short feed cam 60 and a long feed cam 61. These cams strike against a projecting nose 62 formed on a reciprocating feed bar 63 which is normally spring-drawn rearward by means of a spring 64, and at its forward end carries a feed pawl 65 engaging a ratchet 66 fast on the side of the gear wheel 67 mounted upon the aforesaid guide shaft 44. The storage roller 68 for the paper is splined upon this shaft 44 as shown in Fig. 5 so that although the paper roll may slide laterally upon said shaft, the revoluble feeding movements of said shaft 44 may through said spline be transmitted to the paper roller to wind the paper thereupon. Since as above explained, the gear wheel 51 has only a half revolution at each complete operation of the machine, the feed bar 63 will be actuated first by the long feed cam 61 upon one operation of the machine and then by the short feed cam 60 upon the succeeding operation of the machine and so on. It will be seen that this feed takes place upon the downward depression of any key and practically ceases at the end of such downward depression, at which time the platen is operated to take the impression from the type, the various cams being timed in this manner. From this it results that when the cost counter is in normal operative position and the cost amount is to be entered, the downward depression of the amount key first feeds forward the paper by a long extent of feed to separate the cost amount from the previous selling amount, and then the platen is operated to take an impression of this cost amount in the right-hand column, and upon the return movement of the amount key the carriage is shifted preparatory for printing in the left-hand column, so that upon the next operation of an amount key for the selling price, the short feed cam 60 is operated to feed the paper only a small extent and thus in the line spacing movements of the paper the selling price for this transaction is spaced a less line spacing distance away from its corresponding cost price amount, while upon the next cycle of transactions when another entry is made of a cost amount the larger feed takes place so that there is a greater line spacing movement between the next cost amount and the preceding selling amount, so that the corrrelated transactions are in this manner easily distinguished since there is an abnormal feed space between any two sets of amounts. Of course these successive cost and selling price amounts are printed respectively, first in the right-hand column and then in the left-hand column, the successive short and long feeds taking place alternately so that the various items are somewhat staggered upon the paper, but this manner of printing easily shows what two amounts belong together because of the greater line spacing movement between successive cycles of transactions. It is to be understood that if desired the short feed cam 60 may be dispensed with so that there would be absolutely no feed taking place between the cost price and the selling price, and since between these two transactions the carriage is shifted laterally, this would result in the selling price being printed directly opposite the cost price but in a different column, and then the feed would take place before the printing for the next cycle of two transactions, which two transactions would be then printed in the line below and both directly opposite each other, and it is desired that the broader claims on this feature be construed broadly enough to cover either this automatic form of successive variations in the extent of feed or the substitute form of first no feed at all and then an actual feed.

The present arrangement as above described by which there is first a short feed and then a long feed with an automatic recurrence of the same, could be used advantageously where the amounts are printed all in the same column instead of in two separate columns, for in case of printing all in one column the cost and selling price amounts would in this manner be grouped since the short feed would take place between the cost price and the selling price and then the long feed would take place just prior to the printing of the succeeding cost price so that the next two entries would be distinctly spaced apart from the former two.

In order to indicate an uncompleted stage in the cycle of operation, a novel form of indicator flash mechanism is provided as follows: The keys as shown in Fig. 2 have resting on their rear ends, tablet indicators 70 bearing at their upper ends indicating tablets 71 for exposing the amounts of the separate transactions which are entered in the machine. Each of the tablet rods is provided with a lug 72 adapted to be engaged by a back rod 73 to retain the indicator in raised and exposed position, this back rod being rocked at each operation of the machine by a mechanism not shown so that at the initial operation of the machine the previously exposed indicators are dropped preparatory to the exposure of the new indicator. A flash or shutter 74 is provided which is also lifted at each operation of the machine so as to hide the indicators while they are being moved to exposed position and then be dropped at a certain time to permit the exposure of the indicators. This flash 74 is carried by side arms 75 and 76 situated respectively at the left-hand and right-hand ends of the machine (see Figs. 4 and 5), and the means of lifting the flash at each operation of the machine comprises an arm 77 extending laterally through a recess in the side frame of the machine and then bent forwardly to project over the aforesaid key coupler 12 so that with the reciprocation of the key coupler the flash will be successively raised and lowered. This construction of the indicators and flash mechanism as far as just described, is old and set forth in said prior patents, the present improvements having to do with mechanism which governs the exposing movements of the flash automatically. On the left-hand end of the aforesaid shaft 15 is a pinion 80 (see Fig. 4) meshing with a double sized gear wheel 81 which, similar to the other gear wheels of this nature has only a half revolution to each complete revolution of the operating shaft. Pivoted upon the left-hand side frame of the machine is a supporting pawl 82 adapted to spring in under a nose 83 projecting from the flash supporting arm 75, so that when the flash is raised by the key coupler, the pawl 82 will spring under the nose 83 and retain the flash in concealing position. The flash will thus remain in this position upon the first complete operation of the machine in which operation, as above described, the cost counter has just been operated so that the cost amount can be registered without the indication thereof being revealed. The gear wheel 81, however, now is turned through one half a complete revolution, and pin 84 on the side thereof is now brought to such position that upon the succeeding operation of the machine said pin will strike the forward extension of the pawl 82 and trip said pawl so as to prevent the same from engaging in under the aforesaid nose 83 so that now the flash may descend with the key coupler and the indicators will be revealed upon this succeeding operation of the machine which of course is the operation in which the selling price amount is entered; and this successive preventing and permitting of the exposure of the indicators by this flash mechanism of course occurs for each cycle of transactions. For the purpose of evenly supporting the flash, this above described mechanism is repeated upon the right-hand side of the machine as shown in Fig. 5, comprising a pawl 82ª which engages a nose 83ª of the right-hand supporting arm 76, this pawl 82ª being tripped in similar manner by a pin 84ª fast upon the side of the aforesaid long feed cam 61 which of course revolves with the gear wheel 51, the pawls 82 and 82ª being acted upon alike by their respective tripping pins to permit the exposure of the indicators at the end of the completed cycle of transactions. In this manner if the machine is left at the intermediate stage of its cycle, namely: the cost transaction only being entered therein, the flash 74 will remain raised concealing the indicators and this flash may of course bear such words as "Sale not registered" as would indicate to the clerk or customer that the completed cycle of transactions had not been entered upon the machine. For the purpose of further calling attention to the incompleted stage of operation, the cash drawer releasing mechanism is arranged to be operated intermittently upon alternate operations of the machine. This mechanism is shown in detail in Fig. 4ª and comprises a cam 90 fast upon the side of the aforesaid disk 32 (see Fig. 2) which effects the shifting of the counters. The cash drawer 91 is normally locked by means of a latch 92 which has an upwardly extending arm 93 extending through a suitable recess in the key coupler 12 and carrying at its upper end an antifriction roller 94 which is acted upon by said cam 90 to lift the latch 92 and release the drawer to permit the same to spring open. Since the gear wheel 31 and its attached drawer release cam 90 are only given a half revolution at each operation of the machine for the entry of the cost amount, the cam has not been brought into position to act upon the roller 94, and will only act upon said roller to release the drawer upon the completion of the succeeding operation of the machine which corresponds with the entry of the selling amount, so that in this manner the drawer is operated automatically only at intermittent intervals corresponding to the completion of the proper cycle of operation. Likewise an alarm mechanism is provided which is also operated only in this intermittent manner so as to announce the completion of the proper cycle of transactions only at the end of the entry of the selling price. This alarm mechanism comprises a bell 100 (see Fig. 4) arranged to be struck by a hammer 101 pivoted at its middle point and having a rearwardly extending arm extending into the path of a cam 102 fast upon the same shaft 103 which carries the aforesaid larger gear wheel 81. It will be obvious that upon the first half revolution of the gear wheel 81 and shaft 103, the cam 102 is not carried around sufficiently far to actuate the bell hammer 101, but upon the next succeeding operation of the machine, corresponding to the entry of the selling price, the cam 102 acts against the bell hammer 101 and rocks the same away from the bell against its spring tension and then permits the same to drop off of the cam and thus sound the bell, so that in this manner the alarm is sounded only upon the proper completion of the cycle of transactions, first the entry of the cost price and then the entry of the selling price.

In order to identify the different transactions as to the clerk making the same, there is provided a series of clerks' keys 110 (see Figs. 1 and 4). Each of these keys is cut away slightly at 111 so as to permit initial movement of the key before the same is brought into contact with the key coupler, and the key is latched in this position by means of a pawl 112 which snaps over a lug 113 on the side of the key. This will retain the clerk's key in initial depressed position, and upon the subsequent movement of the key coupler by the complete depression of any amount key, the clerk's key which has thus been initially depressed will be given its complete movement of depression, thereby raising its clerk's indicator 114 and also setting the clerk's printing wheel to position to print the clerk's letter upon the detail strip in connection with the amount. This setting of the printer wheel is effected by means of a roller 115 on the side of the clerk's key, which roller acts in a cam slot 116 formed in a rock plate 117 fast to the shaft 118 which extends transversely across the machine as shown in Fig. 1 and at its other end has fast to it a segment 119 which meshes with a pinion 120 fast upon a collar 121 upon the outer end of which is a clerk's printer wheel 122; and the aforesaid cam slots 116 are formed so that the different clerk's keys will rock their respective plates 117 differently and thereby rock the shaft 118 differentially to set the clerk's printer wheel to proper position corresponding to the key depressed.

Since it is desirable to have the clerk's initial printed both with the cost price amount and the selling price amount so that the two corresponding amounts may be readily identified upon the detail strip, and since it is desired to obviate the necessity of the clerk pressing his own initial key twice for this cycle of operation, means are provided whereby when a clerk has once given his clerk's key an initial depression for the registration of the cost amount, the key will not be restored completely to normal upper position until the selling price has been registered. This mechanism comprises the aforesaid latching pawl 112 operating in conjunction with a releasing link 130 (see Fig. 4). This link 130 extends rearwardly and is bifurcated at its rearward end to straddle the aforesaid stub shaft 103, and carries a pin 131 acted upon by the aforesaid cam 102. The forward end of this link is attached to a crank arm 132, which arm is fast to a shaft 133 upon which the latch pawls 112 are also made fast. From the position of the cam 102, (which it will be remembered is carried by the gear wheel 81 which has a half revolution at each complete operation of the machine) it will be apparent that upon the first operation of the machine for the registration of the cost amount, the cam 102 will have no effect upon its pin 131 so that the link 130 will not be reciprocated and any clerk's key which has been depressed will remain latched in its depressed position by its latch pawl 112; so that upon the next succeeding operation of the machine for the registration of the selling price the clerk's key will have remained in this initially depressed position and will again be carried downward upon the operation of the amount keys so as again to print the clerk's initial and leave the clerk's indicator finally exposed, but at the end of such second operation, the cam 102 has completed its revolution and has acted upon the pin 131 to force the link 130 forward and thereby rock the shaft 131 to release the latch pawl 112 from engagement with its lug 113 and thereby permit the clerk's key to return completely to normal position. Of course in the present instance this mechanism is used to cause the key to be given two successive complete depressions after an initial movement thereof, at the end of which time the key is released to return to normal position but it is to be understood that similar mechanism might be used for giving the key any desired number of successive complete depressions upon successive operations of the machine, all coming within the scope of the invention.

For the purpose of taking care of special transactions a series of three special transaction keys 140 are provided (see Fig. 1) marked respectively "Charge," "Rec'd. on acct." and "Paid out." Each of these keys has mounted upon its side as shown in Fig. 3 a roller 141 which coöperates with a rock plate 142 formed with a cam slot 143. These cam plates are fast upon a sleeve 144 surrounding the aforesaid transverse shaft 118, and as shown in Fig. 1, at the right-hand end of this collar 144 is a segment 145 which meshes with a pinion 146 fast upon the end of a collar 147 which at its outer end carries a special transaction printing wheel 148, so that upon the depression of any one of the special transaction keys its corresponding rock plate 142 will be rocked to a certain extent, so that by this mechanism the special transaction keys differentially set the special transaction printing wheel 148, this mechanism being similar to that shown in the aforesaid Cleal Patent No. 773,060. As also described in said Cleal patent, this collar 144 has fast to it and extending upward and rearwardly therefrom, an arm 150 which at its upper end is curved forward to form a throwout arm 151 and said arm is beveled at its forward end so that upon the rocking of the sleeve 144 by any one of the special transaction keys the beveled throwout arm will be forced forward to engage the spring-actuated plunger 23 and force the plunger inward so as to bring its notched portion in the path of the throwout lever 22 and thus disable the counter so that it will not be thrown into operative position. This throwout arm 151 (as seen in Fig. 1) is situated only opposite the right-hand or selling price counter 19, so that these special transaction keys operate to throw out only this right hand counter. However when the machine is in its normal stage ready for operation of the amount keys to add upon the cost counter 20, these special transaction keys 140 are locked by reason of a lug 152 which is carried upon the side of the aforesaid arm 26 carried by the laterally shifting rod 25, so that when the rod 25 is shifted to the left as it is preparatory to the operation of the counter 20 as above described, this lug 152 is practically in lateral alinement with the throwout arm 151 so that the arm cannot be forced forward because of striking against this lug and therefore no one of the special keys 140 can be depressed. This locking mechanism for the special transaction keys when the rod 25 is shifted in this manner is the same as that described in the aforesaid Cleal Patent No. 773,060. It is therefore necessary to put the machine through its first stage in the cycle of operations and thereby shift the rod 25 to the right before these special transaction keys can be depressed, and this is effected by providing a "no sale" key 153 (see Fig. 1) which simply gives the machine a complete operation when depressed and raised, and thereby by the previously described shifting mechanism shifts the rod 25 to the right to prepare the selling price counter 19 for operation. Of course no amount keys are operated in connection with the "no sale" key and this "no sale" key therefore effects the printing of a line of zeros showing the fact that it was the "no sale" key which was depressed. The machine being left at this intermediate stage, with the flash raised to concealing position and the cash drawer not open nor the alarm sounded, the clerk may now operate any one of the special transaction keys in connection with amount keys for entering the amount of such special transaction, and the effect of the throwout arm 151 operated by these special keys is now to prevent the operation of the selling price counter 19 even though that counter had previously been set for operation, so that by this means none of the special transaction amounts are added upon the selling price counter, and of course since the special transaction keys are locked when the cost counter is ready for operation, neither counter has entered upon it these amounts of special transactions, the various amounts of the same being determined from the printed record upon the detail strip. Thus for any special transaction there would be printed upon the detail strip, first in the right hand column the clerk's initial with a series of zeros designating the "no sale" transaction and then in the left-hand column and slightly below, the same clerk's initial with the abbreviated designation of the special transaction, and the amount of such special transaction, and the machine would then have been put through its normal cycle of operations, the special transaction indicators and the amount indicators having been displayed at the end of such cycle and the drawer opening and the bell sounding as an accompaniment thereto. In order that the special transaction keys may be conveniently depressed at the same time with amount keys, these special transaction keys are arranged to have an initial movement to position the same to be picked up by and operated by the key coupler when the amount keys are operated. As shown in Fig. 3 each special transaction key 140 is cut away at its rearward end at 160 so as to permit the initial movement of the key until the same comes in contact with the key coupler and pivoted upon each special key is a latching pawl 161 pivoted at 162 and drawn upon either side of its pivotal point by a spring 163. The normal position of this pawl is as shown in Fig. 3 but upon the initial operation of the special key, the rear end of the key is raised slightly until the cut-away portion 160 strikes the key coupler, and then the pawl 161 is permitted to turn slightly about its pivot until its foot 164 rests upon the stationary cross bar 165 and thereby prevents the return of the key to normal position; but upon the continued raising of the rear end of the special key by the operation of any amount key, due to the fact that the special key has in this manner been moved into the path of the key coupler, the key coupler strikes the head 166 of the pawl 161 and during the upward movement of the key coupler forces the head 166 backward and thereby turns the pawl 161 about its pivotal point until the spring 163 draws on the other side of the pivotal point so that upon the descent of the special key with the key coupler, the tail 167 will first strike the cross bar 165 and thereby rock the pawl 161 reversely about its pivotal point and permit the key to return completely to normal position as shown in Fig. 3. This specific form of pawl mechanism for permitting this initial movement of the special key and insuring the return thereof to normal position is shown in the co-pending application of Thomas Carney, Serial No. 67306, filed July 6, 1901. And by this mechanism it will be apparent that any special key may be given an initial depression and will then be completely operated by the ordinary operation of the amount keys.

The key 153 has been referred as a "no sale" key and its function is to prepare the selling counter for operation. It will be clear that to open the drawer to make change will only require two depressions of the "no sale" key as two operations of said key will give a complete rotation to cam 90 (Fig. 4ª) and will therefore release the drawer latch. No registration will be made but a line of zeros will be printed at each operation of the key.

It is old in the art to have a cost and selling price machine in which amounts are alternately registered first upon one counter and then upon another, such for example as shown in the patent to Jos. P. Cleal, No. 693,498, dated Feb. 18, 1902, but in this Cleal patent it is necessary for the operator first to operate a manipulative device to prepare the first counter for operation, which manipulative device is automatically returned to normal position at the end of this first operation of the machine so that upon the next succeeding operation of the machine the amount is added upon the other or selling price counter, but it is then necessary to work the manipulative device again to prepare for operation of the cost counter, and it is believed that it is broadly new in the art to effect this result automatically without the necessity of the use of such a manipulative device; that is: it is broadly new in machines of this character to incorporate therein means for causing successive operations of the operating mechanism to automatically operate accounting devices in cyclic succession according to a certain predetermined order, whether these accounting devices be registers or printing devices. It is also old in the art to print successive amounts in different columns, but in such means as have hitherto been used for effecting this purpose, a laterally shifting carriage has been used which has required manipulation by hand to position the same initially even though it be returned to normal position by spring tension or positively by the operation of the machine; and it is believed that it is new and novel in the art to provide means for automatically grouping the printing impressions of analogous transactions according to their order in a certain cycle of successive operations, whether such grouping be effected by means of printing in separate columns on a single strip of paper or by means of printing upon entirely separated strips of paper. It is also believed that broadly new in the art to control in this automatic manner for a continuous succession of operations, the exposure of the indicator mechanism, opening of the cash drawer, the sounding of the alarm, the repetition of movements of the clerks' keys, and the differential feeding mechanism, all of which devices when incorporated into one machine constitute a cost and selling price machine which minimizes the amount of manipulations necessary for the complete transactions and goes far to insure the proper completion of the entire cycle of entries connected with one entire transaction.

The machine of the present invention has been mainly described as a cost and selling price machine, but it has many other uses. Many commercial establishments employ some type of cipher system for indicating the cost of articles, such as a series of numbers, and in the use of this machine in such an establishment the cost cipher numbers would be indicated on the keys and would thus be printed in a column separate from the selling price figures on the record strip and would incidentally also be added on what has been termed a "cost" totalizer. Of course the addition of such arbitrary numbers on the cost totalizer would be entirely meaningless and the total of no value. In fact, with such a use the cost totalizer might as well be removed entirely from the machine and the amounts received alone added on the single remaining counter. In other establishments customers are frequently given customer identifying numbers for convenience in posting to ledger accounts. In the use of this machine in connection with that system it would again be true that the identifying numbers would be printed in the so-called cost column of the record strip adjacent the selling price amounts, and also the identifying numbers would be added on the "cost" totalizer. Here also the addition of these identifying numbers would be meaningless, and the "cost" totalizer might as well be removed from the machine. In the operation of such a system the keys representing the customer's number would first be depressed, thus recording in one column of the record strip. At this operation the record strip would be shifted so that upon depressing the keys representing the amount of the transaction, this amount would be entered on the single totalizer and listed on the record strip in juxtaposition to the customer's account number. At convenient times the bookkeeper would post from the record strip to the proper customers' accounts the amounts of the various transactions, as each transaction would be identified by the customer's number recorded adjacent thereto. Again, the machine has a utility in banks. Many banks now are given what is termed a "transit number" and their dealings with each other are identified by this transit number. In the use of this invention the transit number takes the place of the identifying number or the cost number just above referred to. With the machine shown the keys representing the transit number would first be operated thus adding this number on the so-called "cost" totalizer and printing it in the "cost" column of the record strip. Next, the amount of the transaction would be indicated on the keys and this would be added on the so-called selling price totalizer and printed in the selling price column of the record strip. Thus, the transit number would be adjacent the amount on the strip and the addition of the transit number on the "cost" totalizer might be entirely ignored. As before, such a use does not require the presence in the machine of the so-called "cost" totalizer at all, and if the machine was to be used entirely as just indicated the "cost" totalizer might be permanently removed from the machine.

The use of the machine in the ways just indicated or in other ways, whether with or without the second totalizer, is considered to be within the present invention, and certain of the claims are intended to cover the use with one totalizer only, and are to be given a corresponding scope.

While the form of mechanism here shown and described is admirably adapted to fulfil the objects primarily stated, it is to be understood that it is not intended to confine the invention to the one form herein disclosed, for it is susceptible of embodiment in various forms, all coming within the scope of the claims which follow.

Having thus described the invention what is claimed as new and desired to secure by Letters Patent is:

1. In a cash register, the combination with a plurality of accounting devices and an operating mechanism, of means for causing continuous successive operations of said operating mechanism to automatically operate said accounting devices in a certain predetermined sequence.

2. In a cash register, the combination with a plurality of accounting devices and a controlling means common thereto for determining the extent of the accounting, of an operating mechanism; and means for causing continuous operations of said operating mechanism to automatically operate said accounting devices in cyclic succession according to a certain predetermined order.

3. In a cash register, the combination with a plurality of counters, and a common amount determining means therefor, of an operating mechanism; and means for causing a continuous succession of operations of said operating mechanism to automatically operate first one counter and then another and then repeat the same cycle of operations.

4. In a cash register, the combination with two independent accounting devices, and a common operating mechanism therefor; of means for causing said operating mechanism to automatically operate said accounting devices alternately upon a continuous succession of operations.

5. In a cash register, the combination with a plurality of totalizers, of a manipulative means arranged for various manipulation according to the transaction to be entered, of an operating mechanism; and means controlled by a continuous series of actuations of said operating mechanism for automatically segregating successive and correlated transactions in said totalizers.

6. In a cash register, the combination with a plurality of accounting devices and an operating mechanism; of means controlled by a continuous series of actuations of said operating mechanism for causing successive operations thereof to operate said accounting devices automatically in a certain predetermined sequence.

7. In a cash register, the combination with a plurality of counters, and a common amount determining means therefor; of an operating mechanism; and means controlled by said operating mechanism for causing a continuous succession of operations thereof to operate automatically first one counter and then another.

8. In a cash register, the combination with two independent accounting devices, and a common operating mechanism therefor; of means controlled by said operating mechanism for causing the same to automatically operate said accounting devices alternately.

9. In a cash register, the combination with a plurality of counters, printing devices, and an operating mechanism therefor; of means for causing a continuous succession of operations of said operating mechanism to operate first one counter and then another; and means for automatically grouping the printing impressions according to the counter operated.

10. In a cash register, the combination with a plurality of counters, and a common amount determining means therefor; of printing devices also controlled by said common amount determining means; an operating mechanism; means controlled by said operating mechanism for causing successive operations thereof to operate automatically first one counter and then another and likewise take printing impressions from said printing devices in separate groups corresponding respectively to the plurality of counters.

11. In a cash register, the combination with a plurality of counters, and a common amount determining means therefor, of printing devices including a shifting carriage; an operating mechanism; and means controlled by a continuous succession of actuations of said operating mechanism for automatically causing first one counter and then another counter to be operated and for likewise automatically shifting said carriage to cause the printing impressions to be taken in groups corresponding to the counters operated.

12. In a cash register, the combination with a plurality of counters, a common amount determining means therefor, of type carriers also controlled by said common amount determining means, an operating mechanism; a shifting carriage for carrying paper for printing in different columns; means for automatically causing a continuous series of actuations of the operating mechanism to operate first one counter and then another and for likewise automatically shifting said printing carriage to cause the printing to be effected first in one column and then in another.

13. In a cash register, the combination with two independent counters, and a common amount determining means therefor, of type carriers also controlled by said amount determining means; an operating mechanism; a shifting carriage for carrying paper for printing in two separate columns; and means for causing said operating mechanism to automatically operate said counters alternately and also shift said carriage automatically to print alternately in separate columns.

14. In a cash register, the combination with a plurality of accounting devices, and a series of operating keys common thereto, of means for causing successive operations of said operating keys to automatically operate said accounting devices in a certan predetermined sequence upon a continuous succession of operations.

15. In a cash register, the combination with a plurality of counters, and a series of operating keys common thereto, of means for causing a continuous succession of operations of said keys to automatically operate first one counter and then another and then repeat the same cycle of operations.

16. In a cash register, the combination with printing devices and a series of operating keys for setting the same and taking an impression therefrom; of means for automatically causing the printing impressions to be taken in different groups according to a certain predetermined sequence upon a continued succession of operation of the operating keys.

17. In a cash register, the combination with printing devices and a series of operating keys for setting the same and taking an impression therefrom; of means controlled by said keys for automatically causing the printing impressions to be taken in different columns.

18. In a cash register, the combination with printing devices and a series of operating keys for setting the same and taking impressions therefrom; of a shifting carriage; and means controlled by said keys for automatically shifting said carriage upon a continued succession of operations to cause the printing to be effected in different groups.

19. In a cash register, the combination with printing devices and a series of operating keys for setting the same and taking an impression therefrom; of a shifting carriage for carrying paper for printing in different columns; and means controlled by said keys for automatically shifting said carriage at each operation of the machine to cause the printing to be effected in different columns.

20. In a cash register, the combination with a plurality of counters and a series of operating keys common thereto; of printing devices also operated by said keys; and means for causing successive operations of said keys to automatically operate first one counter and then another and also automatically cause the printing impressions to be taken in different groups corresponding to said counters.

21. In a cash register, the combination with a plurality of counters and a series of operating keys therefor; of printing devices also controlled and operated by said keys; a shifting carriage for effecting printing in different groups; and means controlled by said keys for automatically causing the operation of first one counter and then another and likewise shifting said carriage automatically to cause the printing impression to be taken in first one group and then another corresponding to the counters operated.

22. In a cash register, the combination with two independent counters, and a series of operating keys common thereto; of type carriers and platen also operated by said keys; a shifting carriage for carrying paper for printing in two columns; and means controlled by said keys for causing successive operations thereof to automatically operate first one counter and then the other and likewise shift said carriage automatically to effect the printing first in one column and then in the other.

23. In a cash register, the combination with an indicating device for indicating the nature of the various transactions, and an operating mechanism therefor; of means controlled by said operating mechanism for automatically preventing the exposure of said indicating device upon certain operations of the machine and permitting the exposure of the same upon the succeeding operation.

24. In a cash register, the combination with an indicating device for indicating the nature of the various transactions, of an operating mechanism therefor; and means for automatically alternately preventing and permitting the exposure of said indicating device upon a continued succession of complete operations of the machine.

25. In a cash register, the combination with an indicating device for indicating the nature of the varous transactions, of a series of operating keys therefor; and means controlled by said keys for automatically alternately preventing and permitting the exposure of said indicating device.

26. In a cash register, the combination with an indicating device for indicating the nature of the various transactions, a series of operating keys therefor; a flash for concealing said indicating device; means controlled by said keys for insuring the retention of said flash in concealing position at the end of one operation of the machine and permitting movement of the same to exposing position upon a succeeding operation of the machine.

27. In a cash register, the combination with a plurality of accounting devices, and an indicating device for indicating the nature of the accounting, of an operating mechanism; and means for causing successive operations of said operating mechanism to automatically operate said accounting devices in a certain predetermined sequence and likewise automatically prevent the exposure of said indicating device when a certain accounting device is being operated.

28. In a cash register, the combination with a plurality of accounting devices and a series of operating keys therefor, of an indicating device for indicating the nature of the accounting; and means controlled by said keys for automatically operating said accounting devices in a predetermined sequence and likewise automatically preventing the exposure of said indicating device when a certain accounting device is operated and permitting the exposure of said indicating device when another accounting device is operated.

29. In a cash register, the combination with two independent counters, and an indicating device for indicating the amount added on the counters, of a series of operating keys; and means controlled by said keys for causing continued successive operations thereof to operate alternately first on one counter and then another and likewise alternately prevent and permit the exposure of the said indicating device upon the corresponding alternate operation of said counters.

30. In a cash register, the combination with an operating mechanism, and an alarm device, of means controlled by said operating mechanism for causing the same to operate said alarm device upon a certain completed operation of the machine while permitting said alarm device to remain inactive upon a succeeding operation of the machine.

31. In a cash register, the combination with an operating mechanism and an alarm device, of means for causing said operating mechanism to operate said alarm device only intermittently upon complete successive operations of the machine.

32. In a cash register, the combination with a plurality of accounting devices and an operating mechanism, of an alarm device; means for causing continued successive operations of said operating mechanism to automatically operate said accounting devices in a certain predetermined sequence; and means for causing said operating mechanism to actuate said alarm device only when a certain one of the accounting devices is operated.

33. In a cash register, the combination with a key and an operating mechanism, of means for automatically causing said operating mechanism to operate said key a plurality of successive times upon successive operations of the machine.

34. In a cash register, the combination with a key having an initial and a final movement, of an operating mechanism for giving the key its final movement after initial depression of said key; and means for causing said operating mechanism to give said key a plurality of complete depressions upon successive operations of the machine and to automatically release the same and allow it to return to normal position at the end of such plurality of operations.

35. In a cash register, the combination with a key having an initial and final movement; means for latching the key after initial movement; an operating mechanism for giving said key its final movement; and a latch releasing mechanism operated by said operating mechanism only intermittently upon complete successive operations of the machine.

36. In a cash register, the combination with a series of amount keys, a series of special transaction keys, and a "no sale" key, of two independent counters, an operating mechanism common to said counters and actuated by said keys, means for automatically connecting said two counters in succession to the operating mechanism on successive actuations of said amount keys, devices normally locking said special transaction keys, means actuated by the "no sale" key, for disconnecting one counter from said operating mechanism and connecting the other counter thereto, and connections whereby operation of said "no sale" key disables the locking mechanism for the special transaction keys.

37. In a cash register, the combination with printing devices including a paper feed mechanism, of means for automatically varying the feed by said mechanism upon a continued succession of operations of the machine.

38. In a cash register, the combination with an operating mechanism, and printing devices including a paper feed mechanism, of means controlled by said operating mechanism for automatically varying the feed by said mechanism upon successive operations of the machine.

39. In a cash register arranged to be given successive complete operations to enter separate cycles of transactions, the combination with printing devices including a paper feed mechanism, of means for automatically varying the feed of said mechanism to cause distinct separation between the printing impressions of successive cycles of transactions.

40. In a cash register, the combination with an operating mechanism, and printing devices including a paper feed mechanism, of means controlled by said operating mechanism for automatically causing the paper feed mechanism to give variable extents of feed upon continued successive operations of the machine.

41. In a cash register, the combination with printing devices, of a shifting carriage for carrying paper for printing in different columns; a paper feed mechanism; and means for varying the feed by said mechanism according to the position of said carriage.

42. In a cash register, the combination with an operating mechanism, of printing devices; a shifting carriage for carrying paper for printing in different columns; means for automatically shifting said carriage to cause the printing to be taken in different columns according to the character of the entry; a paper feed mechanism; and means for varying the feed of said mechanism according to which character of entry is to be made.

43. In a cash register, the combination with a key having an initial and a final movement, of means for latching said key after its initial movement, a key coupler for giving said key its final movement, and a latch releasing mechanism operated by said coupler only intermittently after a plurality of operations of the machine.

44. In a cash register, the combination with type carriers and keys controlling the setting of said carriers, of a paper carriage, and means for automatically shifting said carriage in opposite directions at successive actuations of said keys.

45. In a cash register, the combination with type carriers, and keys for operating the same, of a shiftable paper carriage, and means controlled by the keys for shifting the carriage in opposite directions at successive actuations of said keys.

46. In a cash register, the combination with indicating mechanism, of a flash for same adapted to be raised and lowered, and means for retaining it in raised position between alternate operations of the machine.

47. In a cash register, the combination with a plurality of accounting devices, and a main operating mechanism therefor common thereto; of devices compelling successive actuations of said mechanism automatically to operate said accounting devices separately in an invariable sequence.

48. In a cash register, the combination with a plurality of accounting devices, a controlling means common thereto for determining the extent of the accounting, and a main operating mechanism; of means compelling successive operations of said operating mechanism automatically to operate said accounting devices separately in an invariable cyclic sequence.

49. In a cash register, the combination with a plurality of counters, a common amount determining means therefor, and a main operating mechanism; of means whereby successive actuations of said main operating mechanism automatically compel operations of said counters separately in an invariable cyclic sequence.

50. In a cash register, the combination with two independent accounting devices, and a common operating mechanism therefor, of means compelling successive actuations of said operating mechanism automatically to actuate said accounting devices separately in an invariable sequence.

51. In a cash register, the combination with accounting devices, manipulative means operable in accordance with characteristics of transactions for controlling the entry on said accounting device, and a main operating mechanism; of means compelling successive actuations of said main operating mechanism to automatically segregate successive entries of transactions on an invariable sequence of the accounting devices.

52. In a cash register, the combination with a plurality of accounting devices, and a main operating mechanism therefor, of automatic means compelling a continuous succession of actuations of said operating mechanism to operate said accounting devices separately in an invariable sequence.

53. In a cash register, the combination with a plurality of counters, a common amount determining means therefor, and a main operating mechanism; of means compelling a continuous succession of actuations of said main operating mechanism to operate the counters separately in an invariable cyclic sequence.

54. In a cash register, the combination with two independent accounting devices, and a common operating mechanism therefor; of means whereby successive actuations of said operating mechanism are automatically compelled to operate said accounting devices separately in alternation.

55. In a cash register, the combination with a plurality of counters, printing devices including a record carrier and a main operating mechanism for said counters and printing devices; of means compelling successive actuations of said operating mechanism to operate said counters separately in an invariable sequence; and means for automatically grouping the printing impressions in correspondence with the counter operated.

56. In a cash register, the combination with a plurality of accounting devices, and a series of operating devices therefor common thereto; of means whereby a continuous succession of actuations of said operating devices cause actuation of said accounting devices separately in an invariable sequence.

57. In a cash register, the combination with a plurality of counters, and a series of operating keys therefor common thereto; of means compelling a continuous succession of actuations of said operating keys to cause actuations of said counters separately in an invariable cyclic sequence.

58. In a cash register, the combination with an indicating mechanism, a flash for concealing said mechanism actuated to be moved to and from a concealing position, and means for moving said flash to concealing position, of means constructed to be operated at alternate actuations only of said indicating mechanism to permit return of said flash from concealing position.

59. In a cash register, the combination with a totalizer; of a printing mechanism; operating keys for the totalizer and printing mechanism; a paper carriage; means for shifting the paper carriage on each operation of the operating keys and a device, operative with said means for shifting, for making the totalizer operative or inoperative.

60. In a machine of the class described, the combination with a plurality of totalizers, of amount determining devices, and means under the control of said devices for automatically actuating the totalizers in cyclic succession upon successive operations of the machine.

61. In a machine of the class described, the combination with a plurality of totalizers, of a recording mechanism including record material, amount determining devices, and means under the control of said devices for automatically actuating the totalizers in cyclic succession and for listing in segregated groups the amounts entered in different totalizers upon successive operations of the machine.

62. In a machine of the class described, the combination with type carriers, of setting up means for said type carriers comprising a plurality of levers, an automatically reciprocating carriage for a record strip on which impressions are taken from the type carriers, said carriage moving in one direction on one operation of the setting up levers and in the opposite direction on the succeeding operation of said setting up levers.

63. In a machine of the class described, the combination with printing devices, of a paper carriage, and keys for operating the printing mechanism with connections whereby said carriage will be moved in one direction on one operation of said keys and in the opposite direction on the next operation of said keys.

64. In a machine of the class described, the combination with a plurality of totalizers, of actuating mechanism common thereto, means for engaging the totalizers with the actuating mechanism, said means automatically engaging the totalizers alternately with the actuating mechanism on successive operations of said mechanism.

65. In a machine of the class described, the combination with a plurality of totalizers, of an operating mechanism therefor comprising a plurality of manipulative value determining devices, and means whereby successive operations of any one of said value determining devices will cause alternate operation of the totalizers.

66. In a machine of the class described, the combination with actuators, of means for differentially reciprocating the same, two sets of wheels independently operable by said actuators, type carriers common to said sets of wheels, printing mechanism, a laterally shiftable paper carriage, and means for automatically shifting the same back and forth between the two columnar positions and coincidentally automatically alternating coöperative relationship between the actuators and the two sets of wheels.

67. In a machine of the class described, the combination with differentially movable driving members, of means for differentially moving the same, two sets of wheels independently operable by said driving members, type carriers common to said sets of wheels, printing mechanism, a laterally shiftable paper carriage, means for automatically shifting the same back and forth between two columnar positions and coincidentally automatically alternating coöperative relationship between the driving members and the two sets of wheels.

68. In a machine of the class described, the combination with actuators and means for differentially reciprocating the same, two sets of totalizer elements independently engageable with and disengageable from said actuators, type carriers common to said sets of totalizer elements, printing mechanism, a laterally shiftable paper carriage, and means for automatically shifting the same back and forth between two columnar positions, and coincidentally automatically alternating coöperative relationship between the actuators and the two sets of totalizer elements.

69. In a machine of the class described, the combination with differentially movable members, of means for differentially moving the same, two sets of totalizer elements independently engageable with and disengageable from said driving members, type carriers common to said sets of totalizer elements, printing mechanism, a laterally shiftable paper carriage, and means for automatically shifting the same back and forth between two columnar positions and coincidentally automatically alternating relationship between the differentially movable driving members and the two sets of totalizer elements.

70. In a machine of the class described, the combination with actuators and means for differentially reciprocating the same, of two sets of totalizer elements independently engageable with and disengageable from the actuators, means for automatically alternating engagement of the two sets of totalizer elements with the actuators, type carriers common to the two sets of totalizer elements, printing mechanism, a laterally shiftable paper carriage, and means for shifting said carriage as an incident to the operation of the aforesaid automatic means.

71. In a machine of the class described, the combination of differentially movable driving members, means for differentially operating same, two sets of totalizer elements independently engageable with and disengageable from said driving members, means for automatically alternating engagement of the two sets of totalizer elements with the driving members, type carriers common to the two sets of totalizer elements, printing mechanism, a laterally shiftable paper carriage, and means for shifting said carriage as an incident to the operation of the aforesaid automatic means.

72. In a machine of the class described, the combination with actuators and means for differentially operating the same, of two sets of totalizer elements independently engageable with and disengageable from said actuators, type carriers common to said sets of totalizer elements, printing mechanism, a laterally shiftable paper carriage, means for automatically shifting same back and forth between two columnar positions and coincidentally automatically alternating coöperative relationship between the actuators and the two sets of totalizer elements, line spacing mechanism, and means for automatically varying the feed of said line spacing mechanism.

73. In a machine of the class described, the combination with differentially movable driving members and means for operating the same, two sets of totalizer elements independently engageable with and disengageable from said driving members, type carriers common to said sets of totalizer elements, printing mechanism, a laterally shiftable paper carriage, means for automatically shifting the same back and forth between two columnar positions and coincidentally automatically alternating coöperative relationship between the driving members and the two sets of totalizer elements, line spacing mechanism, and means for varying the feed by said mechanism according to the position of said carriage.

74. In a machine of the character described, the combination of operating racks, means for differentially reciprocating the same, two sets of wheels independently operable by the racks, and means for automatically alternating coöperative relationship between the racks and the two sets of wheels.

75. In a machine of the character described, the combination of operating racks means for differentially reciprocating the same, two sets of wheels independently operable by the racks, type carriers common to said sets of wheels, printing mechanism, a laterally shiftable paper carriage, and means for automatically shifting the same back and forth between two columnar positions and coincidentally automatically alternating coöperative relationship between the racks and the two sets of wheels.

76. In a machine of the class described, the combination with type carriers and keys for operating the same, of a support for record material, and means controlled by the keys for effecting a relative movement between the type carriers and said support at successive operations of the keys.

77. In a machine of the class described, the combination with type carriers and keys for controlling the setting of said carriers, of a support for record material, and means for automatically effecting a relative movement between the type carriers and said support at successive actuations of the keys.

78. In a machine of the class described, the combination with actuators and means for operating same, of a plurality of totalizers independently operable by said actuators, type carriers, a paper carriage, and means for automatically effecting relative movement between the type carriers and said carriage to print in separate columns and coincidentally automatically establishing coöperative relationship between the actuators and the totalizers in an invariable sequence.

79. In a machine of the class described, the combination with actuators and means for differentially driving same, of a plurality of sets of totalizer elements independently engageable with and disengageable from the actuators, means for automatically establishing coöperative relation between the actuators and the totalizers in an invariable sequence, type carriers, a paper carriage and means for effecting a relative movement between the type carriers and the paper carriage as an incident to the operation of the aforesaid automatic means, whereby to print successive items in different columns.

80. In a machine of the class described, the combination with a plurality of totalizers, of actuating devices therefor, type carriers, a paper carriage, and means whereby successive operations of the actuating devices will automatically cause actuation of the totalizers in an invariable sequence and a relative movement between the paper carriage and the type carriers whereby to print successive items in different columns.

81. In a machine of the class described, the combination with a plurality of totalizers, of actuators therefor, type carriers, a support for record material, an operating mechanism comprising a plurality of keys for operating the actuators and setting the type carriers, and means whereby successive operations of said keys will automatically effect actuation of the totalizers in an invariable sequence and a relative movement between the type carriers and the aforesaid support to print successive items in separate columns.

In testimony whereof I affix my signature in the presence of two witnesses.

JONATHAN B. HAYWARD.

Witnesses:
WM. O. HENDERSON,
CARL J. BENST.